Nov. 5, 1963  W. R. NICHOLS  3,109,630
RECIRCULATION SYSTEM FOR WET-REMOVAL OF PRECIPITATED DUST
Filed Sept. 26, 1960  2 Sheets-Sheet 1

INVENTOR.
WILLIAM R. NICHOLS.
BY
Leo I. MaLossi.
his ATTORNEY.

United States Patent Office 3,109,630
Patented Nov. 5, 1963

3,109,630
RECIRCULATION SYSTEM FOR WET-REMOVAL OF PRECIPITATED DUST
William R. Nichols, San Mateo, Calif., assignor to Koppers Company, Inc., a corporation of Delaware
Filed Sept. 26, 1960, Ser. No. 58,383
5 Claims. (Cl. 259—4)

This invention relates to apparatus for removing liquid-soluble dust from dust-collection equipment and, more particularly, to a recirculation system for preventing the build-up of precipitated dust at the bottom of the liquid bath in the collector vessel of an electrical precipitator.

Since the arrangement of electrodes in the typical electrical precipitator is either square or rectangular in plan-form, and since the simplest means by which dust or ash can be removed from these electrodes is by simply shaking or vibrating them, the general pattern of the falling dust or ash approximates that of the arrangement of the electrodes; to wit, square or rectangular. The shape in plan of the collector means for the falling dust or ash naturally assumes this same shape and is filled to a predetermined level with the liquid or liquor forming part of the industrial process.

In the case of the sulfate process used in the production of paper pulp, after the cellulosic material has been digested, a week black liquor is separated from the stock resulting from the digestion process and some of this weak black liquor is transferred to the collecting means at the bottom of the electrical precipitator. The balance of the weak black liquor is concentrated by evaporation and then burned in a conventional recovery furnace. Since the concentrated black liquor when burned produces fly ash which contains valuable chemical constituents, it is desirable to remove this fly ash from the gases resulting from the burning process prior to exhausting these gases into the atmosphere. The gases are, therefore, passed through an electrical precipitator which removes the ash by deposition upon its electrodes. As has been indicated above, the electrodes are then vibrated, shaking off the fly ash or dust which then falls into the weak black liquor at the bottom of the electrical precipitator fortifying this liquor as a result.

It is typical in the prior art devices to agitate the liquid in the collector means in an attempt to prevent the settling out of the dust or ash which would necessitate periodic cleaning of the bottom of the collector means. Unfortunately, since the prior art agitating means are mechanical ones which sweep in a circular motion, the liquid which is located in the corners of the collector means or vessel receives inadequate agitation. This permits the settling out of the precipitated dust or ash upon the bottom of the collector.

It is, therefore, an object of the invention to provide agitation means for the collector vessel which thoroughly agitates the liquid in all portions of the vessel preventing the build-up of dust on the bottom.

A further object of the invention is to provide a construction for the collector vessel which will enable the removal of liquid from the vessel at such a point and in such a way as to aid the swirling motion.

Still another object of this invention is to provide agitation means which are accessible from the exterior of the precipitator thereby eliminating the need for shut-down for internal maintenance.

An added object of the invention is the provision of a recirculation system for the collector vessel ensuring a supply of liquid for the vessel independent of the industrial process producing the dust.

Other aims, objects, and advantages will be either pointed out or become apparent in the following detailed description, wherein.

Figure 1:
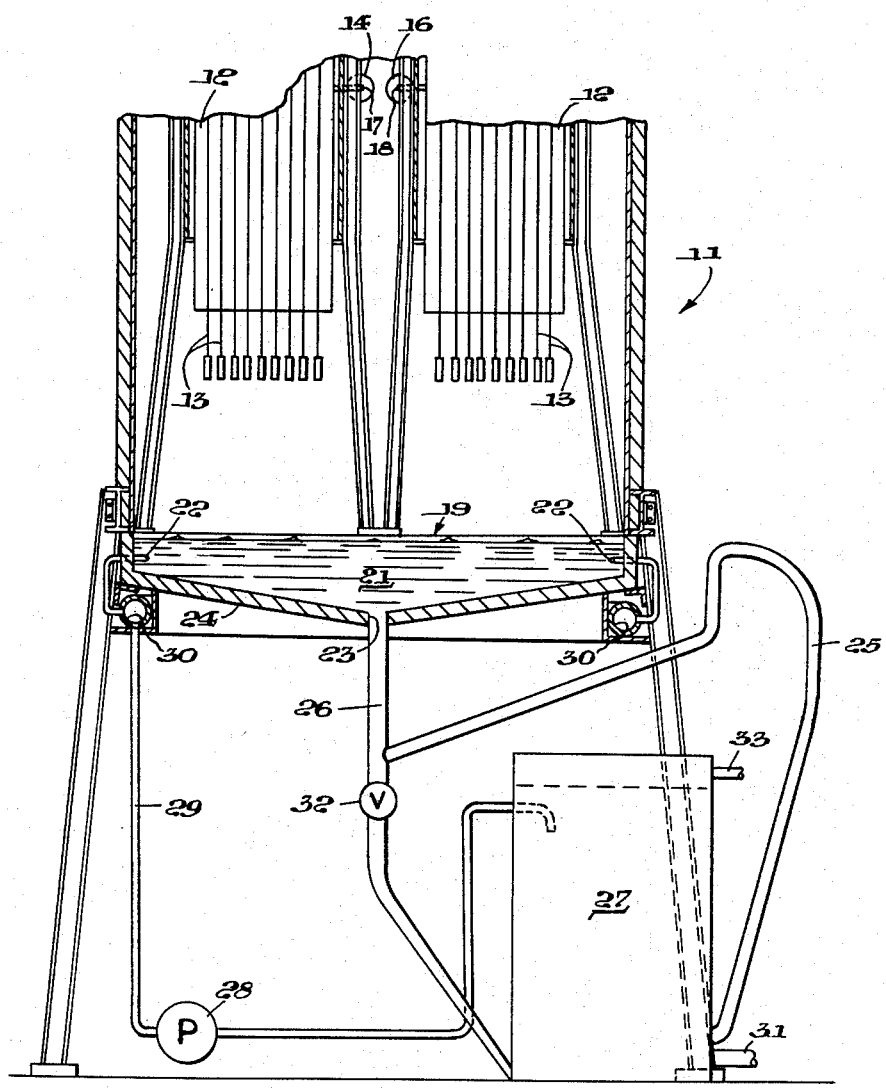
FIGURE 1 is a partial section of an electrical precipitator employing a preferred embodiment of the invention for recirculating the liquor.
Figure 2:
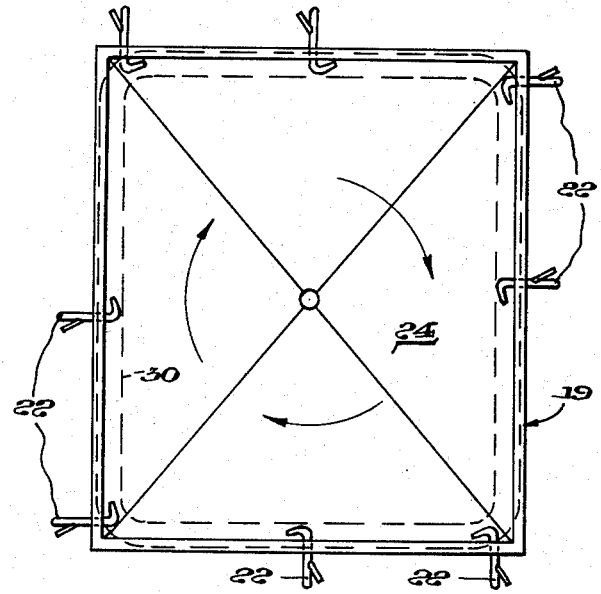
FIGURE 2 is a plan view of the collector vessel showing a typical nozzle arrangement.

Referring to the drawings, there is shown in FIGURE 1 a portion of an electrical precipitator of the type used in the production of paper pulp by the so-called sulfate process. The precipitator 11 has in the upper portion thereof extended surface electrodes 12 which are vertically suspended in parallel, horizontally spaced relationship and fine wire or other discharge electrodes 13 suspended between the plate electrodes 12 and spaced therefrom. Precipitator 11 is energized in the conventional manner as by grounding the collecting electrodes 12 and supplying high tension current to discharge wires 13 insulated from collector electrodes 12 in any manner well known in the art.

When flue gases are passed between the discharge electrodes 13 and the collecting electrodes 12, the suspended material borne by the gases is precipitated upon surface electrodes 12 in the form of a dry powdery deposit. Once precipitated, this ash or dust is removed from the surfaces of the electrodes by rapping or shaking the electrodes in any conventional manner. In FIGURE 1, the vibration of the plates is accomplished by the use of vibrators 14 and 16 which transmit their vibrations to collecting electrodes 12 through rods 17 and 18. Additional means not shown may also be used to dislodge such particulate material as may be deposited on the discharge electrode system.

When dislodged, the precipitated ash or dust falls from electrodes 12 and 13 into collector vessel 19 wherein is contained a pool of weak black liquor 21 to dissolve this ash. In order to maintain liquor 21 in an agitated condition, collector vessel 19 is provided with nozzles 22 located around the perimeter thereof as shown and particularly in the corners of vessel 19. Additional weak liquor is forced from nozzles 22 into collector vessel 19 and nozzles 22 are so directed that the ejected liquor will cause the entire body of liquor 21 to swirl in a clockwise direction. Since the swirling motion is imparted from the corners, the dust or ash cannot settle in these areas and is retained suspended in the liquor 21 until it becomes dissolved thereby fortifying the liquor 21. The liquor which is ejected from nozzles 22 travels in a circuit being exhausted from outlet 23 at the lowest point in the bottom 24 of collector vessel 19, passing through seal 25 via conduit 26, entering recirculation tank 27 and being removed therefrom by pump 28 to be forced through pipes 29 into manifold 30 for distribution to and ejection from nozzles 22 into collector vessel 19. Seal 25 serves to maintain a substantially constant level within collector vessel 19. As is shown in FIGURE 1, the level is maintained to a depth covering nozzles 22. This arrangement offers an added benefit in that there are no braces or other portions of mechanical agitating means protruding above the surface of the liquor 21. Therefore, any falling dust or ash must find its way into the liquor 21. Also, since the plan area of the collector vessel 19 decreases at successively lower stations approaching the outlet 23, liquor on its way to outlet 23 increases in velocity providing an additional deterrent to possible settling of dust on bottom 24 of collector vessel 19. The cumulative effect of the agitation and of the increased velocity of the outgoing liquor is to constantly sweep the bottom, keeping it clean and thereby obviating shut-downs and maintenance.

Recirculation tank 27 enables the solids content of the liquor to be built up to any desired point since the less concentrated liquor is removed from near the top by the pump 28 to be recirculated to collector vessel 19 while the heavier fortified liquor settles to the bottom for removal through pipe 31 for transfer to the cascade evaporators (not shown). The large volume of liquor which can be maintained in recirculation tank 27 provides the added advantage of maintaining a sufficient supply of liquor so that the recirculation system can continue to operate after the main plant supply of liquor has been cut off. Also, should it become necessary to drain vessel 19, recirculation tank 27, if sufficiently large, can be used as a reservoir for the liquor in the bath. In the event that seal 25 should become plugged with material and draining thereof is required, or in the event it should become necessary to drain vessel 19 for any other reason, gate valve 32 is provided by-passing seal 25. As fortified liquor is removed from recirculation tank 27 via pipe 31, additional weak black liquor is introduced to recirculation tank 27 via pipe 33 connected to the weak black liquor storage tank (not shown).

Figure 3:
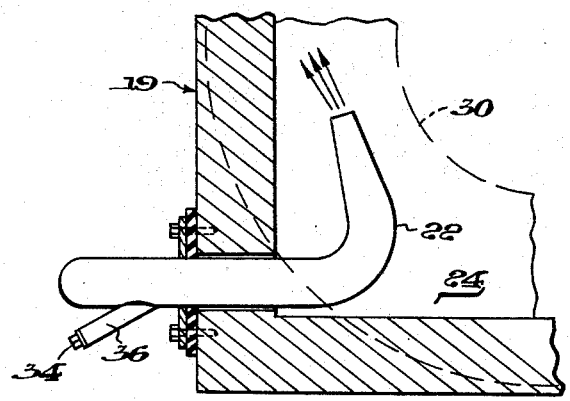
FIGURE 3 is a detailed view of an individual nozzle showing the provisions for cleaning the nozzle.

In FIGURE 3 is shown the manner of mounting nozzles 22 which penetrate the side walls of collector vessel 19 and the means provided for exterior accessibility to these nozzles 22. Thus, plug 34 may be removed to enable any needed cleaning of these nozzles without the removal thereof by simply working through Y-connection 36. Should it be necessary at any time to remove nozzles 22 or to clean them, collector vessel 19 can be drained sufficiently to lower the level of the liquid therein to a point below the elevation of nozzles 22. Nozzles 22 can then be cleaned or removed from the outside. As shown, nozzles 22 are mounted in such a way as to impart a clockwise swirl to liquid 21, this direction being selected since the swirling motion is thereby aided by the rotation of the earth. However, should it be desirable to reverse the direction of swirl, this feature is, of course, optional.

Among the advantages of the present invention over the prior art mechanical agitators is its simplicity in that the typical prior art agitator is arranged to pierce the bottom 24 of the container vessel 19 thereby involving the necessity for leak-proof shaft fittings in addition to bearings and speed reducers to power the mechanical means.

The invention is not limited to the sulfate process described herein, but may find application in any number of industrial processes involving the collection of liquid-soluble dusts by the use of wet-removal methods.

What is claimed:

1. A collector vessel for the gathering of precipitated liquid-soluble dusts by the use of swirling liquid comprising in combination a liquid-tight container having an open top, a bottom and a plurality of side walls forming corners and extending upward from the outer edges of said bottom, said container having an outlet through said bottom, a plurality of connected portions having substantially smooth uninterrupted upper surfaces forming said bottom, said surfaces being inclined toward said outlet, said bottom having a variable cross-sectional plan area in successive horizontal planes diminishing from a maximum at the intersection of said bottom and said side walls to a minimum at said outlet, said container having a substantially constant level of liquid therein, means located in said corners at an elevation below said level of liquid and above said intersection of said bottom and said side walls for ejecting additional liquid under pressure into said container substantially parallel to said side walls thereby causing the body of liquid in said vessel to swirl and means connected to said outlet to remove therefrom liquid in excess of that volume required to maintain said level of liquid.

2. A collector vessel as described in claim 1 wherein the container is rectangular in cross-section and the ejection means comprise inwardly-directed nozzles.

3. A vessel substantially as described in claim 2 wherein the nozzles are so oriented as to impart a clockwise swirl to the body of liquid in the container.

4. A collector vessel for the gathering of precipitated liquid-soluble dusts by the use of swirling liquid comprising in combination a liquid-tight container having an open top, a bottom and a plurality of side walls forming corners and extending upward from the outer edges of said bottom, said container having an outlet through said bottom, a plurality of connected portions having substantially smooth uninterrupted upper surfaces forming said bottom, said surfaces being inclined toward said outlet, said bottom having a variable cross-sectional plan area in successive horizontal planes diminishing from a maximum at the intersection of said bottom and said side walls to a minimum at said outlet, said container having a substantially constant level of liquid therein, a plurality of nozzles located in said corners and about the periphery of said container with at least one nozzle in each of said corners, said nozzles being directed into said container substantially parallel to said side walls at an elevation below said level of liquid and above said intersection of said bottom and said side walls, a cleanout connection for each nozzle, said cleanout connection being accessible from outside said container and means connected to said outlet to remove therefrom liquid in excess of that volume required to maintain said level of liquid.

5. A recirculation system as described in claim 4 wherein the container is rectangular in cross-section.

References Cited in the file of this patent

UNITED STATES PATENTS

| | | |
|---|---|---|
| 368,733 | Ryan | Aug. 23, 1887 |
| 2,672,946 | Rabkin et al. | Mar. 23, 1954 |
| 2,792,905 | Forrest | May 21, 1957 |
| 2,841,238 | Lenehan | July 1, 1958 |